(12) United States Patent
Zhou et al.

(10) Patent No.: US 11,016,469 B2
(45) Date of Patent: May 25, 2021

(54) NC CONTROL METHOD AND A NC CONTROL APPARATUS

(71) Applicant: HUAZHONG UNIVERSITY OF SCIENCE AND TECHNOLOGY, Hubei (CN)

(72) Inventors: Huicheng Zhou, Hubei (CN); Chenglei Zhang, Hubei (CN); Yakun Jiang, Hubei (CN); Jihong Chen, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 252 days.

(21) Appl. No.: 15/954,165

(22) Filed: Apr. 16, 2018

(65) Prior Publication Data

US 2018/0299866 A1    Oct. 18, 2018

(30) Foreign Application Priority Data

Apr. 17, 2017 (CN) .......................... 201710249656.0
Apr. 8, 2018 (CN) .......................... 201810305822.9

(51) Int. Cl.
| G05B 19/408 | (2006.01) |
| G05B 19/418 | (2006.01) |
| G05B 19/4103 | (2006.01) |
| G05B 19/4155 | (2006.01) |

(52) U.S. Cl.
CPC ..... *G05B 19/4083* (2013.01); *G05B 19/4103* (2013.01); *G05B 19/4155* (2013.01); *G05B 19/41885* (2013.01); *Y02P 90/02* (2015.11)

(58) Field of Classification Search
None
See application file for complete search history.

(56) References Cited

U.S. PATENT DOCUMENTS 10,466,681 B1 * 11/2019 Jones ................ G05B 19/40937

* cited by examiner

*Primary Examiner* — Sean Shechtman
(74) *Attorney, Agent, or Firm* — Hamre, Schumann, Mueller & Larson, P.C.

(57) ABSTRACT

The invention provides a NC control method and a NC control apparatus for implementing the method. The method comprises: acquiring a first NC code and a second NC code, wherein the first NC code comprises first machining information for controlling a tool to machine a workpiece, and the second NC code comprises second machining information for enhancing the first machining information; simultaneously running the first NC code and the second NC code to parse out the first machining information and the second machining information; merging the first machining information and the second machining information; and controlling the tool to machine the workpiece according to the result of the merging. The invention also provides a NC control apparatus and a computer storage medium for machining controlled both by the first and the second NC code.

17 Claims, 11 Drawing Sheets

NC CONTROL METHOD AND A NC CONTROL APPARATUS

FIELD OF THE INVENTION

The present invention relates generally to the field of NC (numerical control) technology, and more specifically to a NC control method according to joint action of two codes and a NC control apparatus for implementing the method.

BACKGROUND OF THE INVENTION

The G&M code program file of NC (hereinafter referred to as G code) follows the ISO 6983 standard, but the motion instructions in the ISO 6983 standard only contain simple arc and line instructions. At present, small segments (for example, arcs or straight lines) are still common tool-path expressions in the processing of complex surfaces. However, the use of CAM (Computer Aided Manufacturing) software to generate the path of discrete small segments loses the geometric features such as mapping relationship of points and surface, and tool-path lateral information on the theoretical model, and makes the G code contain only the position information of the surface shape of the workpiece, and causes the inaccuracy of the NC system in speed planning and spline fitting, which makes the actual machining result inconsistent with the theoretical design model. And it is difficult to improve the machining accuracy.

In order to solve the problem of lack of such information in G code, the present method used by NC system is to spend a lot of time and resources to reconstruct these missing geometric feature information (such as tangent direction, curvature, and so on) in the stage of preprocessing (a certain number of NC blocks). However, the NC system must also ensure strong real-time performance (for example, at least millisecond real-time performance), and the complexity of information reconstruction algorithms cannot be too high. Therefore, the accuracy of the NC system using preprocessing blocks to calculate these geometric feature information is limited. The real-time calculation forces the NC system to make a trade off between unrestricted hardware configuration and sacrificing algorithm calculation accuracy, which limits the overall performance of the NC system.

At present, some systems use a processor with better performance to improve the processing speed and accuracy. For example, the NC systems of Siemens 802D s1 and above versions support the blocks compressor function COMPCAD. COMPCAD instructions can be used to optimized the program of CAD (computer-aided design)/CAM without prior surface optimization. Although this improves the quality and efficiency of the processing, the COMPCAD function requires a higher NC system configuration to use. Therefor the scope of use is limited and the cost is increased.

In addition, the factors that affect the quality of NC machining also include the machine-specific response performance and machining process parameter. The influence of the machine-specific response performance is mainly reflected in the following two aspects. On one hand, due to the different response performance of each machine tool, different optimization and compensation information is needed even if the same workpiece is machined. On the other hand, due to the different path characteristics of different workpiece and different process schemes, the optimal compensation amount for the response performance of the same machine tool is also different. The influence of processing parameters is mainly reflected in the feed speed and spindle speed. For each CNC machining program (G code), reasonable optimization is needed to balance the spindle current and cutting load in the entire machining process. Optimizing these influencing factors can improve the processing quality of the workpieces to varying degrees. However, the optimization information currently have no suitable way to input into the NC system for optimization compensation other than directly modifying the G code or adding additional information into the G code. Modifying the G code or adding extra information into the G code breaks the G code's versatility and makes it difficult to use on different machines.

In order to solve the above problems, some related arts in the field have made some studies. For example, some European companies and research institutes have proposed STEP-NC standards including all three-dimensional geometric information, tool information, manufacturing features, and process information. The STEP-NC standard introduced feature descriptions (e.g., slots, pockets, holes, planes, etc.) relative to the ISO 6983 standard and used the EXPRESS language for programming. Therefore, it is necessary to use information extraction and interpreters for STEP-NC files instead of G. Code compiler, and use EXPRESS programming language. This method is difficult to be compatible with traditional programming software and NC systems based on G code, so so far it has not been practically applied. The EXPRESS language adopted by the STEP-NC standard still has only one set of code files, and lacks the information input way to optimize\compensate the machine-specific response performance and processing parameters without destroying the generality of the processing code.

SUMMARY OF THE INVENTION

In order to solve the above problems, the present invention proposes a NC processing mechanism, which uses two sets of NC codes (G codes) to simultaneously control a numerical control machining process. Specifically, the NC machining mechanism adds a second NC code, which includes the geometrical attribute information of the tool-path, and to improve the machining effect, without changing the format and syntax of the existing G code, to assist the existing G code to achieve better processing control.

According to a first aspect of the present invention, a NC control method is provided. The method comprise: acquiring a first NC code and a second NC code, wherein the first NC code comprises first machining information for controlling a tool to machine a workpiece, and the second NC code comprises second machining information for enhancing the first machining information; simultaneously running the first NC code and the second NC code to parse out the first machining information and the second machining information; merging the first machining information and the second machining information; and controlling, according to the result of the merging, the tool to machine the workpiece.

In one embodiment, the first machining information comprises position information of the tool on the surface of the workpiece, and the second machining information comprises the geometric feature information of the tool-path corresponding to the position information.

In one embodiment, the controlling, according to the result of the merging, the tool to machine the workpiece, comprises: optimizing, according to the result of the merging, machining speed and/or tool-path fitting; and controlling, according to the optimized machining speed and/or the tool-path fitting, the tool to machine the workpiece.

In one embodiment, the acquiring the second NC code, comprises: determining, according to the first NC code, the geometric feature information of the tool-path; and generating the second NC code by associating the position information in the first NC code with the geometric feature information.

In one embodiment, the geometric feature information comprises at least one of the following: curvature information; tangent direction information; and tool-path lateral information, comprising the corresponding relationship between the geometric feature information of neighbor cutter location of two neighbor paths in the direction perpendicular to the path.

In one embodiment, the acquiring the second NC code, comprises: acquiring, according to the three-dimensional model of the workpiece, the geometric feature information of the tool-path; and generating the second NC code by associating the position information in the first NC code with the geometric feature information.

In one embodiment, the geometric feature information comprises at least one of the following: affiliation of points and surface, including the correspondence between the cutter location points and the surfaces of the workpiece; curvature information; tangent direction information; and tool-path lateral information, comprising the corresponding relationship between the geometric feature information of neighbor cutter location of two neighbor paths in the direction perpendicular to the path.

In one embodiment, the first machining information comprises position information of the tool on the surface of the workpiece, and the second machining information comprises compensation information of the machining error associated with the characteristic of the machine tool.

In one embodiment, the controlling, according to the result of the merging, the tool to machine the workpiece, comprises: optimizing, according to the result of the merging, machine tool compensation; and controlling, according to the optimized machine tool compensation, the tool to machine the workpiece.

In one embodiment, the acquiring the second NC code, comprises: determining the compensation information from the machine tool historical data; and generating the second NC code by associating the position information in the first NC code with the compensation information.

In one embodiment, the compensation information comprises compensation information of the tracking error.

In one embodiment, the first machining information comprises machining process parameter information of the workpiece machining, and the second machining information comprises optimization information of machining process parameter for optimizing machining process parameters.

In one embodiment, the controlling, according to the result of the merging, the tool to machine the workpiece, comprises: optimizing, according to the result of the merging, the machining process of the workpiece; and controlling, according to the optimized machining process, the machining of the workpiece.

In one embodiment, the acquiring the second NC code, comprises: determining the optimization information of machining process parameter from the machine tool historical data; and generating the second NC code by correlating the machining process parameter information in the first NC code with the optimization information.

In one embodiment, the optimization information of machining process parameter comprises optimization information of the machining feed speed and/or optimization information of the spindle speed.

In one embodiment, the second NC code comprises: verification information for verification whether the first NC code and the second NC code match; and index information for establishing the NC blocks mapping relationship between the first NC code and the second NC code.

In one embodiment, the index information is the block number of the NC blocks.

In one embodiment, verifying, according to the verification information, whether the first NC code and the second NC code is match, before simultaneously running the first NC code and the second NC code.

According to a second aspect of the present invention, a NC control apparatus is provided. the apparatus comprises: an acquiring unit, configured for acquiring a first NC code and a second NC code, wherein the first NC code comprises first machining information for controlling a tool to machine a workpiece, and the second NC code comprises second machining information for enhancing the first machining information; a parsing unit, configured for simultaneously running the first NC code and the second NC code to parse out the first machining information and the second machining information; a merging unit, configured for merging the first machining information and the second machining information; and a controlling unit, configured for controlling, according to the result of the merging, the tool to machine the workpiece.

In one embodiment, the first machining information comprises position information of the tool on the surface of the workpiece, and the second machining information comprises the geometric feature information of the tool-path corresponding to the position information.

In one embodiment, the controlling unit is configured for: optimizing, according to the result of the merging, machining speed and/or tool-path fitting; and controlling, according to the optimized machining speed and/or the tool-path fitting, the tool to machine the workpiece.

In one embodiment, the acquiring unit is configured for: determining, according to the first NC code, the geometric feature information of the tool-path; and generating the second NC code by associating the position information in the first NC code with the geometric feature information.

In one embodiment, the geometric feature information comprises at least one of the following: curvature information; tangent direction information; and tool-path lateral information, comprising the corresponding relationship between the geometric feature information of neighbor cutter location of two neighbor paths in the direction perpendicular to the path.

In one embodiment, the acquiring unit is configured for: acquiring, according to the three-dimensional model of the workpiece, the geometric feature information of the tool-path; and generating the second NC code by associating the position information in the first NC code with the geometric feature information.

In one embodiment, the geometric feature information comprises at least one of the following: affiliation of points and surface, including the correspondence between the cutter location points and the surfaces that make up the face of the workpiece; curvature information; tangent direction information; and tool-path lateral information, comprising the corresponding relationship between the geometric feature information of neighbor cutter location of two neighbor paths in the direction perpendicular to the path.

In one embodiment, the first machining information comprises position information of the tool on the surface of the workpiece, and the second machining information comprises compensation information of the machining error associated with the characteristic of the machine tool.

In one embodiment, the controlling unit is configured for: optimizing, according to the result of the merging, machine tool compensation; and controlling, according to the optimized machine tool compensation, the tool to machine the workpiece.

In one embodiment, the acquiring unit is configured for: determining the compensation information from the machine tool historical data; and generating the second NC code by associating the position information in the first NC code with the compensation information.

In one embodiment, the compensation information comprises compensation information of the tracking error.

In one embodiment, the first machining information comprises machining process parameter information of the workpiece machining, and the second machining information comprises optimization information of machining process parameter for optimizing machining process parameters.

In one embodiment, the controlling unit is configured for: optimizing, according to the result of the merging, the machining process of the workpiece; and controlling, according to the optimized machining process, the machining of the workpiece.

In one embodiment, the acquiring unit is configured for: determining the optimization information of machining process parameter from the machine tool historical data; and generating the second NC code by correlating the machining process parameter information in the first NC code with the optimization information.

In one embodiment, the optimization information of machining process parameter comprises optimization information of the machining feed speed and/or optimization information of the spindle speed.

In one embodiment, the second NC code comprises: verification information for verification whether the first NC code and the second NC code match; and index information for establishing the NC blocks mapping relationship between the first NC code and the second NC code.

In one embodiment, the index information is the block number of the NC blocks.

In one embodiment, the apparatus further comprises a detection unit which is configuring for verifying, according to the verification information, whether the first NC code and the second NC code is match, before simultaneously running the first NC code and the second NC code.

According to a third aspect of the present invention, a NC control apparatus is provided. The apparatus comprises: communication Interface; at least one processor; And a memory that stores the processor-executable instructions that, when executed by the at least one processor, enable the apparatus to perform the method according to the first aspect of the present invention.

The fourth aspect of the present invention provided a computer storage medium. The computer storage medium store computer-executable instructions that, when executed by at least one processor of a NC control apparatus, enable the apparatus to perform the method according to the first aspect of the present invention.

According to the above technical solution of the present invention, the present invention uses two NC codes (i.e., the first NC code and the second NC code) to perform joint action on the NC machining process. Specifically, the present invention can extract the information lacked by the existing G code from the three-dimensional model or the existing G code (the first NC code) before machining the workpiece, and compile it into the second NC machining code. And then the NC system merges the first NC code and the second NC code for NC machining. In this way, the information lacked by the existing G code can be compensated by the second NC machining code without changing the existing G code. Thereby the consumption of real-time computing resources is reduced, and better processing control is achieved while retaining the traditional G code processing method, being compatible with the existing programming software and NC system, and facilitating practical promotion and application.

BRIEF DESCRIPTION OF DRAWINGS

The above and other aspects, features and advantages of the present invention will be readily apparent and fully understood from the following detailed description of illustrative embodiments in conjunction with the accompanying drawings, which are included by way of example, and not by way of limitation with regard to the claimed invention.

In all the drawings of the present invention, the same or similar structures are identified by the same or similar reference numerals.

DETAILED DESCRIPTION OF THE INVENTION

Figure 1:
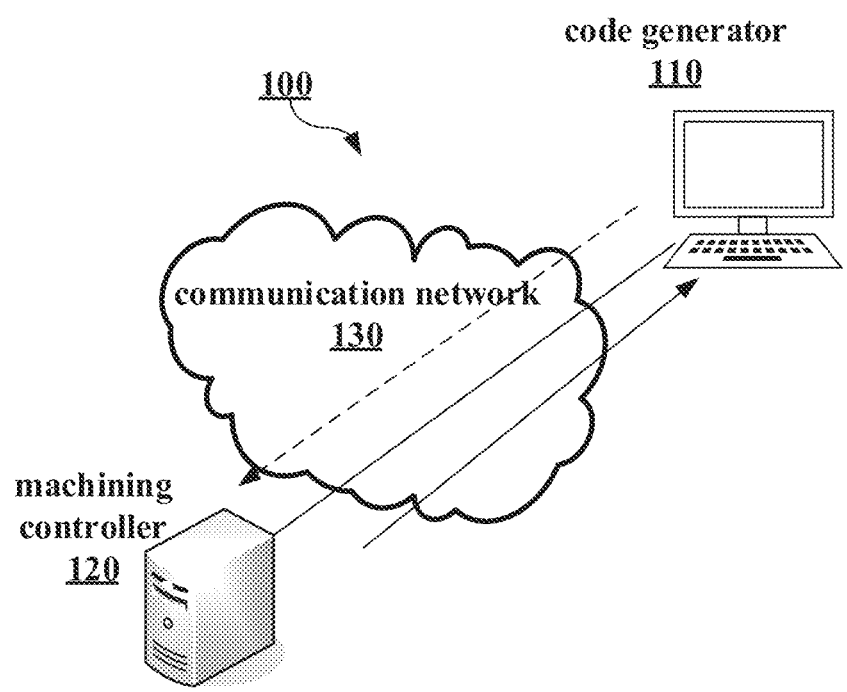
FIG. 1 is a schematic diagram illustrating an application scenario of a NC system 100 according to the present invention.

Hereinafter, embodiments of the present invention will be described in detail. Examples of the embodiments are illustrated in the accompanying drawings, wherein the same or similar reference numerals denote the same or similar elements or elements having the same or similar functions throughout. The embodiments described below with reference to the drawings are exemplary. The embodiments are used to explain the present invention, and cannot be construed as limiting the present invention.

It will be understood by those skilled in the art that the singular forms "a," "an," "said" and "the" used herein may also include plural forms unless specifically stated. It should be further understood that the word "comprising" used in the description of the present invention refers to the presence of the features, integers, steps, operations, elements and/or components, but does not exclude the existence or addition of one or more other features, integers, steps, operations, elements, components, and/or groups thereof. It will be understood that when we say that an element is "connected" to another element, it can be directly connected to other elements, or intermediate elements may also be present. In addition, "connection" used herein may include wireless connection. As used herein, the phrase "and/or" includes all or any and all combinations of one or more of the associated listed items.

Those of ordinary skill in the art will understand that, unless otherwise defined, all terms (including technical and scientific terms) used herein have the same meaning as commonly understood by one of ordinary skill in the art to which this invention belongs. It should also be understood that terms such as those defined in a general dictionary should be understood as having a meaning that is consistent with the meaning in the context of the prior art and should not be idealized or excessive unless specifically defined as here.

FIG. 1 is a schematic diagram illustrating an application scenario of a NC system 100 according to the present invention. As shown in FIG. 1, the NC system 100 may include a code generator 110 and a machining controller 120 for controlling a numerical control machining process based on a joint action of two code (also referred to as dual code joint control). The code generator 110 may use a CAM programming software such as UG to generate a first NC code (e.g., G code) for processing a specific workpiece. The code generator 110 may also generate a second NC code according to information such as geometric feature information such as a tool-path, which contributes to the improvement of the processing effect. The machining controller 120 can simultaneously run the first and second NC codes to control the processing of the specific workpiece by the tool. The code generator 110 and the processing controller 120 may be connected through the communication network 130 or may be integrated together.

The code generator 110 may be any device suitable for writing and generating NC codes, and may include a user interaction interface installed therein for receiving a user's processing requirements for a workpiece to be processed. Although the code generator 110 is illustrated as a desktop computer for convenience of illustration in FIG. 1, it should be understood that the code generator 110 may also be a hand-held computer, a laptop computer, a tablet computer, and so on. The machining controller 120 may be a device such as a processor having code execution capabilities and control capabilities (e.g., control tools or machine tools), for example, the machining controller 120 may be part of a numerical control system (CNC). Communication network 130 may be wired or wireless. Specifically, examples of the communication network 130 may include (but are not limited to): a wired cable or fiber type network, or a mobile or cellular network or WLAN ("wireless LAN", possibly 802.11 (or WiFi) or WiMAX), or a wireless short-range communication network of blue-tooth.

The code generator 110 may include a code compiling client installed therein, such as UG (Unigraphics NX) software and other suitable CAM programming software. The code compiling client can automatically generate a NC code (i.e., a first NC code) for controlling the tool to process the workpiece according to the workpiece processing requirements. The user can also write or automatically generate a second NC code for enhancing the information contained in the first NC code by the code compiling client.

Figure 2:
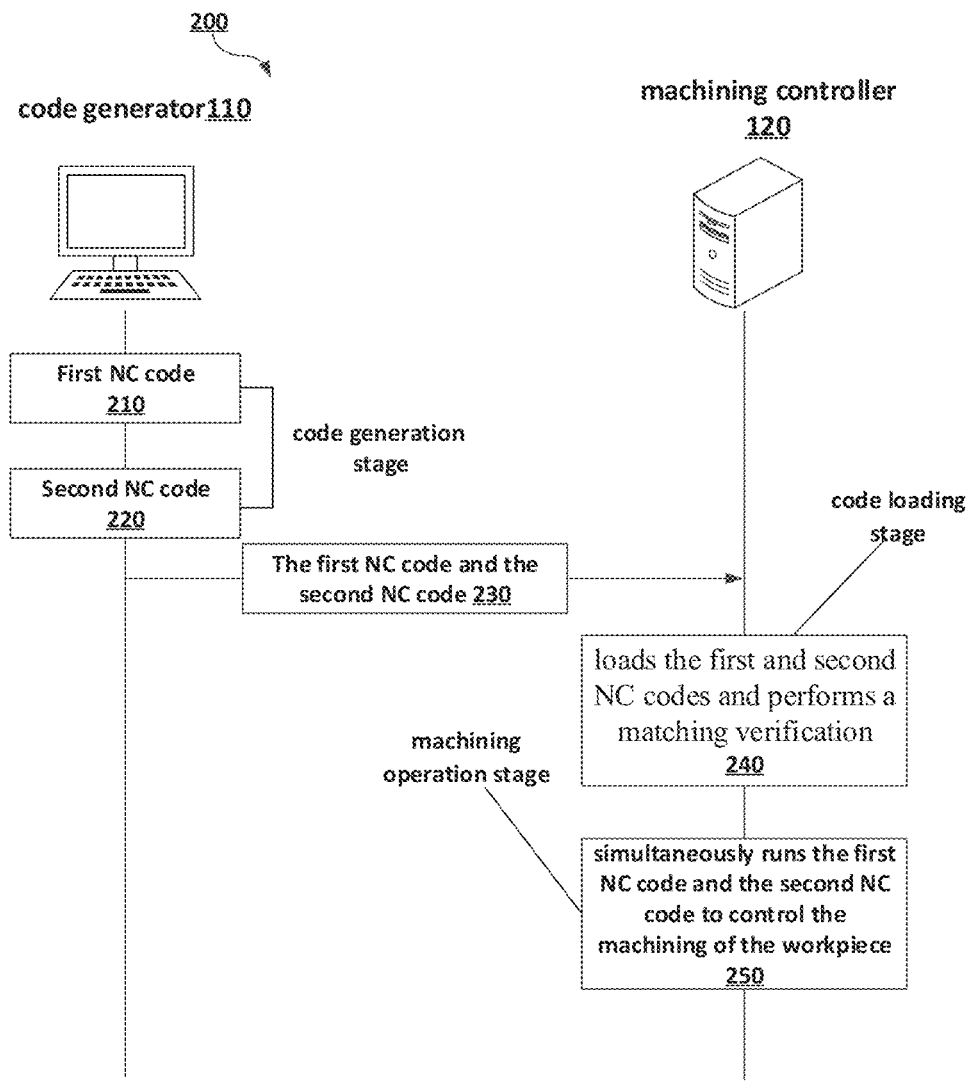
FIG. 2 is a timing diagram illustrating an example operation 200 of a NC system 100 according to an embodiment of the present invention.

In the following, the general inventive concept of the present invention will be described mainly with FIG. 1 as an example. FIG. 2 is a timing diagram illustrating an example operation 200 of a NC system 100 according to an embodiment of the present invention. An example operation 200 is for controlling a NC process according to joint action of two codes. The following description is made by taking the control console 120 as part of the NC system as an example. However, it should be understood that the present invention is not limited thereto.

As shown in FIG. 2, at block 210, the code generator 110 automatically generates, through a code compiling client, a NC code (hereinafter referred to as the first NC code, for example, G code) comprising the machining information (hereinafter referred to as the first machining information) for controlling a tool to process a workpiece according to the workpiece processing requirements (for example, according to a CAD model of a workpiece).

At block 220, the user writes at the code generator 110, for example, through a code compiling client, or the code generator 110 automatically generates a second NC machining code, such as a G code. The second machining information included in the second NC code is used to enhance the first machining information to improve the machining effect.

The first NC code and the second NC code generated at blocks 210 and 220 are the basis for the joint action of two codes of the present invention.

Blocks 210 and 220 are also referred to as code generation stage. The code generation stage can be a NC machining preparation stage or an off-line process. The first NC code may not be generated at the code generator 110, but may be generated on any other device suitable for compiling and generating a NC code. Correspondingly, the first NC code may not be generated during the code generation stage, but may already be generated before the code generation stage.

At block 230, the code generator 110 transmits the generated first and second NC codes to the machining controller 120, for example, through the communication network 130.

At block 240 (also referred to as code loading stage), the machining controller 120 loads the first and second NC codes and performs a matching verification in the NC system to ensure that the first NC code matches the second NC code. If the verification result is non-matching, subsequent operations cannot be performed and it is necessary to return to processing again.

In the code loading stage, whether or not to use the second NC code can be determined by setting a switch (for example, a switch set in the NC system). If the switch is on, the NC system simultaneously loads the second NC code while loading the first NC code. If the switch is off, the NC system only loads the first NC code. For example, the HUAZHONG model-8 NC system determines whether to use the second NC machining code by setting the second NC code enable parameter. Specifically, when the enable parameter is set to 1, it means that the second NC code is in use. And the HUAZHONG model-8 NC system simultaneously loads the first NC code and the second NC code in the code loading stage before processing. When the enable parameter is set to 0, it means that the second NC code is not in use. And the HUAZHONG model-8 NC system only loads the first NC code in the code loading stage before processing.

At block 250 (also referred to as a process control stage), the machining controller 120 simultaneously runs the first NC code and the second NC code to control the machining of the workpiece of the tool according to the operation result, thereby implementing the numerical controlling based on the joint action of the two codes.

Figure 3:
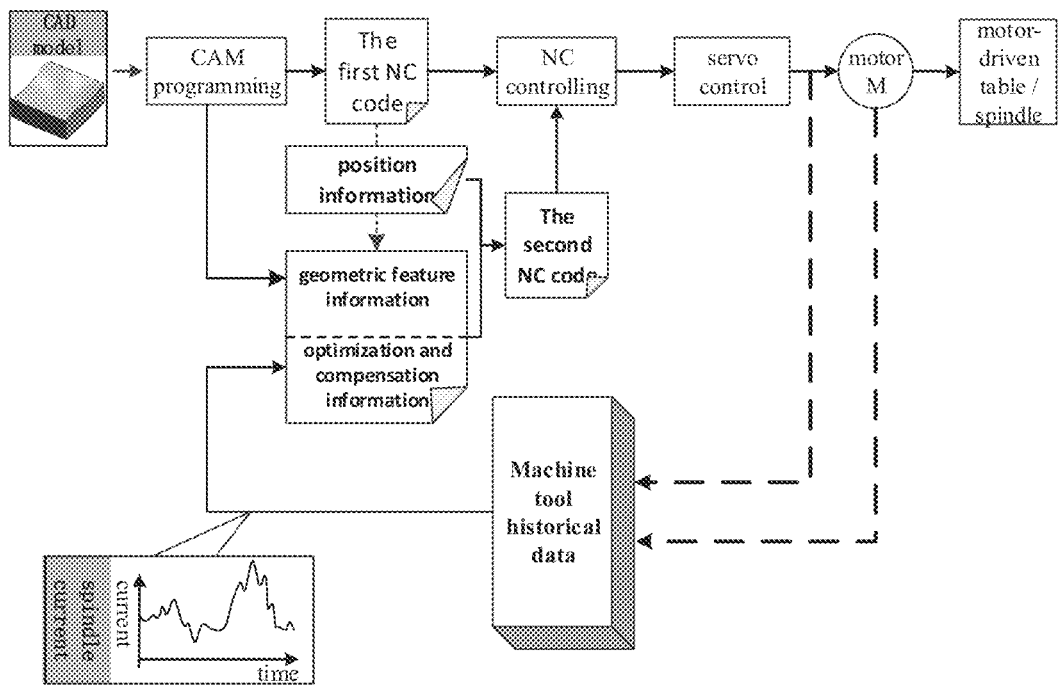
FIG. 3 shows an exemplary schematic diagram of a tow code joint action according to an embodiment of the present invention.

FIG. 3 shows an exemplary schematic diagram of a tow code joint action according to an embodiment of the present invention.

As shown in FIG. 3, as a typical NC code, the first NC code is generated through CAD geometric modeling and CAM programming of the workpiece to be processed, and may include first machining information for controlling the tool to process the workpiece. For example, the position information of the tool on the surface of the workpiece, and the machining process parameter information of the workpiece processing.

The second NC code may be generated according to the first NC code and/or the three-dimensional model of the workpiece and/or machine tool historical data. The second machining information included in the second NC code is used to enhance the first machining information, and correspondingly the first machining information in the first NC code should match the second machining information while generating the second NC code.

Figure 4:
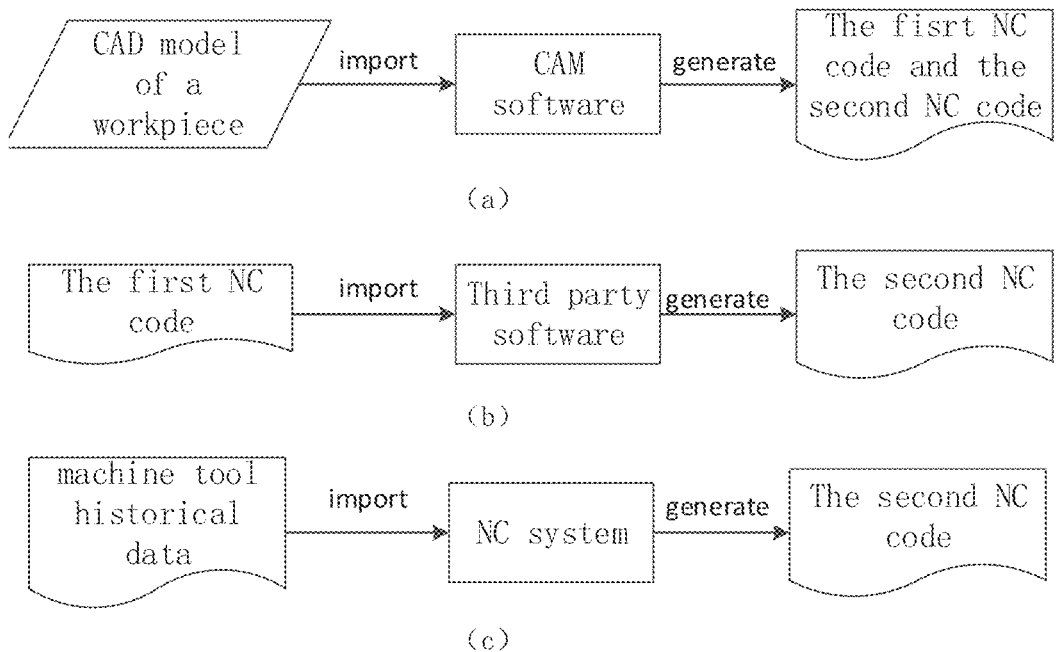
FIG. 4 shows a schematic diagram of three exemplary ways of generating a second NC code according to an embodiment of the present invention.

FIG. 4 shows a schematic diagram of three exemplary ways of generating a second NC code according to an embodiment of the present invention.

As shown in FIG. 4(a), the first method is to generate the second NC code while generating the first NC code by CAM software or the like. For example, this can be achieved by CAM software that includes a second NC code generating module. This method generally generates a second NC code by extracting second machining information from a three-dimensional model of a workpiece (e.g., a CAD model).

As shown in FIG. 4(b), the second method is to import the first NC code into a third party software (such as iScope, and so on) to generate a second NC code. For example, this can be achieved by the third party software that includes a second NC code generating module. In this manner, the first NC code needs to be generated before the second NC code is generated.

As shown in FIG. 4(c), the third method is to generate a second NC code by the NC system in the machining preparation stage, that is, to generate a second NC code on the NC system. For example, this method may generate the second NC code according to the machine tool historical data in combination with the first NC code. For example, the compensation information and optimization information of machining process parameter related to the machine tool characteristics may be extracted from the machine tool historical data through a dedicated software including a second NC code generation module, and the second NC code is generated with the extracted information respectively associated with the position information and machining process parameter information in the first NC code.

In one example, the first machining information may include position information indicating the tool-path (i.e., position information of the tool on the workpiece surface). In this case, the second machining information may include geometric feature information of the tool-path corresponding to the position information of the tool on the surface of the workpiece, so as to be able to enhance the position information and optimize the processing speed and/or the path fitting. As shown in FIG. 3, the geometric feature information can be obtained from the three-dimensional model of the workpiece, or can be obtained from the first NC code. For example, if the geometric feature information includes at least one of curvature information, tangential direction information, or tool-path lateral information, the geometric feature information may be acquired from the first NC code or from the three-dimensional model of the workpiece. If the geometric feature information includes affiliation of points and surface, the geometric feature information can be obtained from the three-dimensional model of the workpiece.

Alternatively, the second machining information may also comprise compensation information of the machining error associated with the characteristic of the machine tool, in order to enhance the position information and optimize the machine tool compensation. As shown in FIG. 3, this compensation information can be determined from the machine tool historical data. For example, the compensation information may include thermal compensation information, tool wear compensation information, and so on.

In another example, the first machining information may comprise machining process parameter information for the workpiece machining. In this case, the second machining information may contain the optimization information of machining process parameter (referred to as process optimization information, for example, optimization information of feed speed and/or optimization information of spindle speed) to enhance the first machining information and optimize the machining process of the workpiece. As shown in FIG. 3, this optimization information of machining process parameter can be determined from the machine tool historical data.

In another word, the second NC code may be generated on the basis of the first NC code in combination with the three-dimensional model of the workpiece and/or the machine tool historical data. As shown in FIG. 3, the machine tool historical data may be acquired from a machining process of a NC machined workpiece, and may also include historical data about the motor, such as historical data about the motor-driven table or the spindle. For example, machine tool historical data may contain historical data about the spindle current.

The second NC code may further comprise: verification information that verifies whether the first NC code match the second NC code; and index information for establishing the NC blocks mapping relationship between the first NC code and the second NC code (for example, the block number of NC blocks).

That is, the second NC code may comprise one or more of the following information:

1) verification information for verification whether the first NC code and the second NC code match;

2) index information or corresponding relationship for establishing the NC blocks mapping relationship between the first NC code and the second NC code (for example, the block number of NC blocks).

3) geometric information of the tool-path, such as curvature, tangent direction, etc.;

4) compensation information (also referred to as machine tool compensation information) relating to machine tool characteristics, such as information related to the amount of compensation of the tracking error (also referred to as compensation information for tracking error); and 5) optimization information of machining process parameter, such as optimization information of feed rate, optimization information of spindle speed, and so on.

For example, an example format of the second NC code may be expressed as follows:

---

Verification information
Machine tool compensation information
Correspondence-information Geometric-feature-information Machine-tool
-compensation-information Process-optimization-information
Correspondence-information Geometric-feature-information Machine-tool
-compensation-information Process-optimization-information
.........
Correspondence-information Geometric-feature-information Machine-tool
-compensation-information Process-optimization-information

---

It should be noted that some machine tool compensation information is valid for the overall G code, and some machine tool compensation information is different for each line of G code.

Two specific examples of the second NC code are listed below.

The first example of the second NC code is as follows:
Date 2016/12/15/13:52:50
N1 R15vec[0.7071, 0.7071, 0]
N2 vec[0.7001, 0.7001, 0.1400]
N3 vec[0.6917, 0.6917, 0.2075]
N4 vec[0.6917, 0.6917, 0.2075]
. . .
N20 R5vec[0.7071, 0.7071, 0]

Among them, a row of numbers and characters followed by the word Date are verification information, and the last modification time of the first NC code matched with the second NC code in this example (i.e., 13:52:50, Dec. 15, 2016) as the verification information; the number after the letter N is the block number information of the block; the number after the letter R represents the radius of curvature; vec is followed by the unit vector represented by the tangent direction of the current point. Since the radius of curvature is modal information, the radius of curvature from the first row to the 19th row is 15 mm, and the radius of curvature of the twentieth row is 5 mm. The radius of curvature and tangent are the geometric characteristics of the tool-path.

The second example of the second NC code is as follows:
Date 2016/12/15/13/52/50
TW0.01
N1   R1.5vec[0.7071,0.7071,0]   $C_p$[−0.1001,0.0001,−0.2400] F0.9926
N2   vec[0.7001,0.7001,0.1400]   $C_p$[0.0843,−0.0254, 0.0145] F1.1364
N3   vec[0.6917,0.6917,0.2075]   $C_p$[0.0042,−0.1645, 0.0354] F1.0
N4   vec[0.6917,0.6917,0.2075]   $C_p$[0.1042,−0.1645,−0.0400] F0.892
. . .
N20 R5vec[0.7071,0.7071,0] $C_p$[0.0242,0.1645,−0.1543] F0.9923

Among them, a row of numbers and characters after the word Date are verification information (the last modified time of the G code matched with the second NC code in the above example is used as verification information); the number after the letter TW is the wear information of the tool; the letter N is followed by the block number information; the number after the letter R represents the radius of curvature; vec is followed by the unit vector represented by the tangent of the current point; $C_p$ is followed by the amount of tracking error compensation of the current point. F is followed by the feed rate optimization factor. In this example, the verification information is the last modification time of the G code, i.e., 15:52:50, Dec. 15, 2016. The tool wear amount is 0.01 mm. Since the radius of curvature is modal information, the radius of curvature from the first row to the 19th row is 15 mm, and the radius of curvature of the twentieth row is 5 mm.

Returning to FIG. 3, next, the first and second NC codes can be loaded on the NC system. The NC system executes the two sets of codes simultaneously during the NC duration to perform NC processing via NC control, servo control, and so on. In this way, it is possible to control the machining of the workpiece by the tool with an optimized machining speed, and/or optimized path fitting, and/or optimized machine tool compensation, and/or an optimized machining process.

By using the joint action of two codes, the present invention has the following advantages over the prior arts.

1. Compared with calculating the required geometric feature information (such as curvature and tangent direction) with a certain number of blocks in the stage of preprocessing of the NC system, the required geometric feature information (or geometric properties) is calculated by the joint action of two codes of the present invention offline or online without real-time conditions. It does not need to satisfy the strict requirements of real-time performance, and therefore it is possible to more accurately calculate the geometric properties of the trajectory using multiple iterations or using a larger range of position information. In addition, the present invention can also obtain geometric feature information required for workpiece machining optimization while generating the existing G code (i.e., the first NC code) with CAM software (e.g., a geometric feature information extraction module integrated in CAM software), and the accuracy of the geometric feature information thus obtained is higher. Therefore, the joint action of two codes can release real-time computing resources of the NC system while obtaining more accurate optimization information, so that the NC system can also exhibit good surface processing performance with the general hardware configuration.

2. Compared with modifying the existing G code (i.e., the first NC code) or creating a new NC coding format to meet the requirements of information expansion, the joint action of two codes of present invention is compatible with the existing G code while the second NC code supplements the deficiencies of the existing G code in terms of geometrical characteristics information, process information related to the machine tool characteristics, and processing optimization information covering capability, and realizes the inheritance and expansion of machining information, which is convenient for promotion and application.

3. Compared with modifying the existing G code (i.e., the first NC code) or creating a new processing code writing format to satisfy the information expansion requirement, the joint action of two codes of present invention also improves the openness of the NC system and provides a way for machine tool manufacturers and machine tool users to input their accumulated experience information into the NC system. Machine tool manufacturers can add personalized optimization and compensation information according to the characteristics of their own machine tools, and the machine tool users can carry out targeted process optimization and compensation according to the workpiece process characteristics of their industry.

4. Compared with directly replacing the NC system or upgrading the configuration of the NC system, the joint action of two codes of the present invention does not need to modify the resolver of the existing NC system, but only needs to add the synchronous analytical function module of the second NC code. It can improve the processing performance. During the NC system's machining process, the NC system's display interface still displays the existing G code, which facilitates the machine operator to set breakpoints for debugging, and the machine operator does not need to relearn a machining programming language.

5. Compared with the case of ignoring the characteristics of each machine tool and ignoring the path characteristics affected by the machine tool characteristics, with the second NC code, the joint action of two codes of the present invention enables the process technician not only to more easily make optimized compensation for different machine tools, but also to carry out characterization optimization compensation for different path characteristics depending on machine tool characteristics, thereby improving the workpiece's machining accuracy, machining efficiency, and dimensional consistency.

6. Compared with the scheme in which the existing G code is directly modified for compensation of process optimization information, the joint action of two codes of the present invention not only ensures the universality of the existing G code, but also realizes the optimization of the process information with the second NC code. Especially in multiple optimizations and long-term productions, this facilitates the retrospection of the original process.

Figure 5:
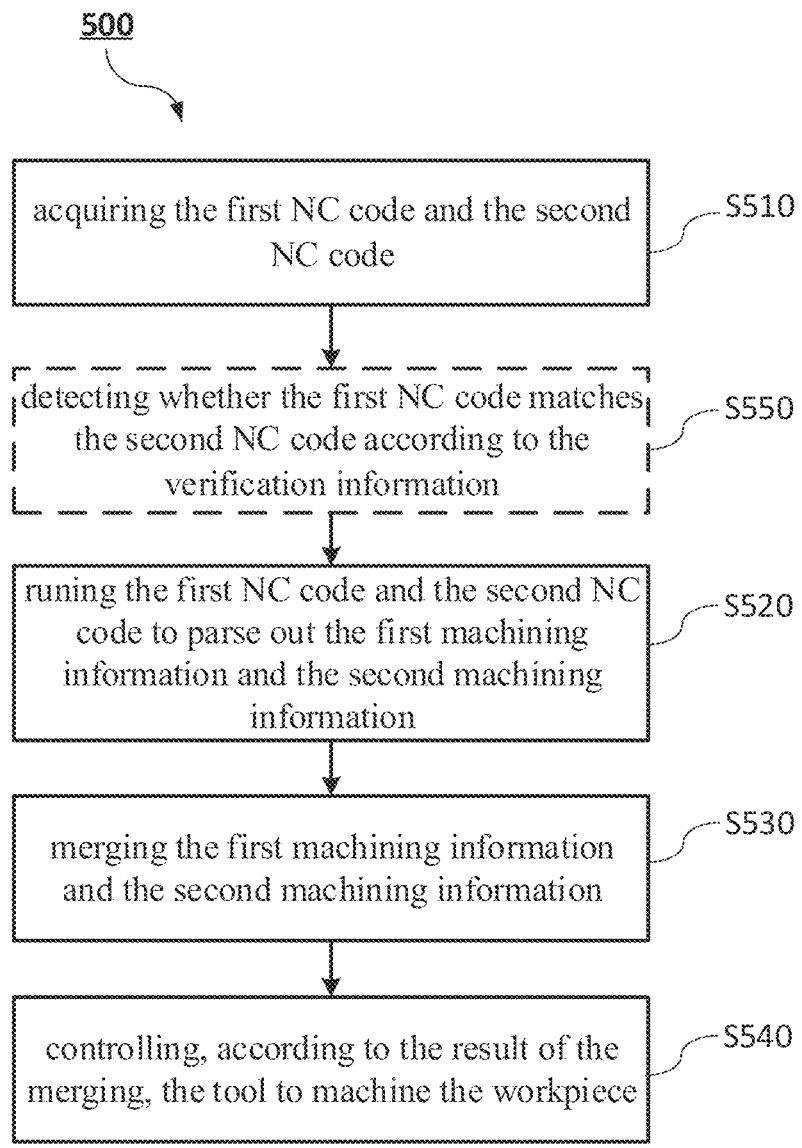
FIG. 5 shows a schematic flow chart of a NC control method 500 based on a joint action of two codes according to an embodiment of the present invention.

FIG. 5 shows a schematic flow chart of a NC control method 500 based on a joint action of two codes according to an embodiment of the present invention. The NC control method 500 may be performed on the machining controller 120 shown in FIG. 1. The following description will be given by way of example. However, it should be understood that the present invention is not limited thereto. The NC control method 500 comprises steps S510-S550, wherein step S550 is optional and occurs between step S510 and step S520.

In step S510, the machining controller 120 acquires the first NC code and the second NC code. The first NC code comprises first machining information for controlling a tool to machine a workpiece, and the second NC code comprises second machining information for enhancing the first machining information;

For example, the machining controller 120 may receive the first NC code and the second NC code from the code generator 110. The machining controller 120 may also receive the second NC code from the code generator 110 and receive the first NC code from other devices suitable for compiling and generating the NC code. The machining controller 120 may also receive the second NC code from other parts on the NC system.

In step S520, the machining controller 120 simultaneously runs the first NC code and the second NC code to parse out the first machining information and the second machining information;

In step S530, the machining controller 120 merges the first machining information and the second machining information;

In step S540, the machining controller 120 controls, according to the result of the merging, the tool to machine the workpiece.

In the first implementation of the method 500, the first machining information includes position information of the tool on the surface of the part, and the second machining information includes geometric information of the tool-path corresponding to the position information. The geometric feature information may include at least one of the following: affiliation of points and surface, including the correspondence between the cutter location points and the surfaces that make up the face of the workpiece; curvature information; tangent direction information; and tool-path lateral information, comprising the corresponding relationship between the geometric feature information of neighbor cutter location of two neighbor paths in the direction perpendicular to the path. In present invention, the tool position points refers to the positioning reference point of the tool.

Figure 6:
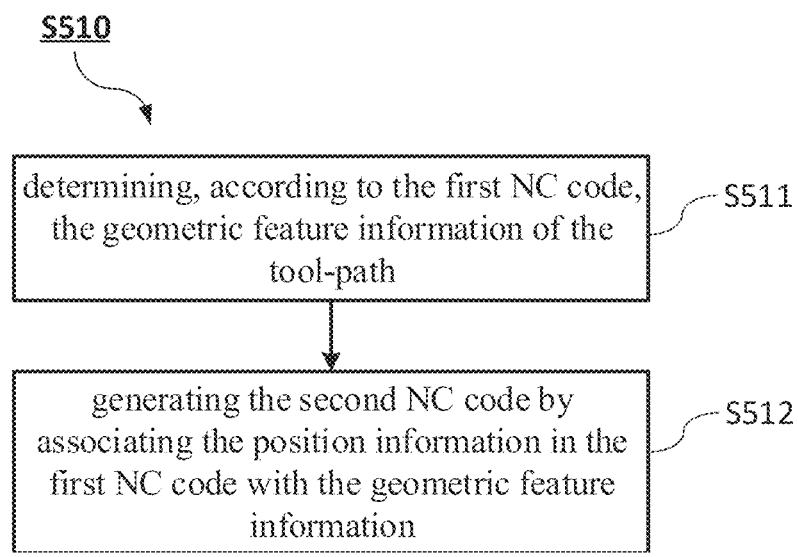
FIG. 6 shows a first example implementation of step S510 according to an embodiment of the invention.

FIG. 6 shows a first example implementation of step S510 according to an embodiment of the invention. This example implementation is applicable to curvature information, tangent direction information, and tool-path lateral information.

In step S511, the machining controller 120 determines, according to the first NC code, the geometric feature information of the tool-path;

In step S512, the machining controller generates the second NC code by associating the position information in the first NC code with the geometric feature information.

Figure 7:
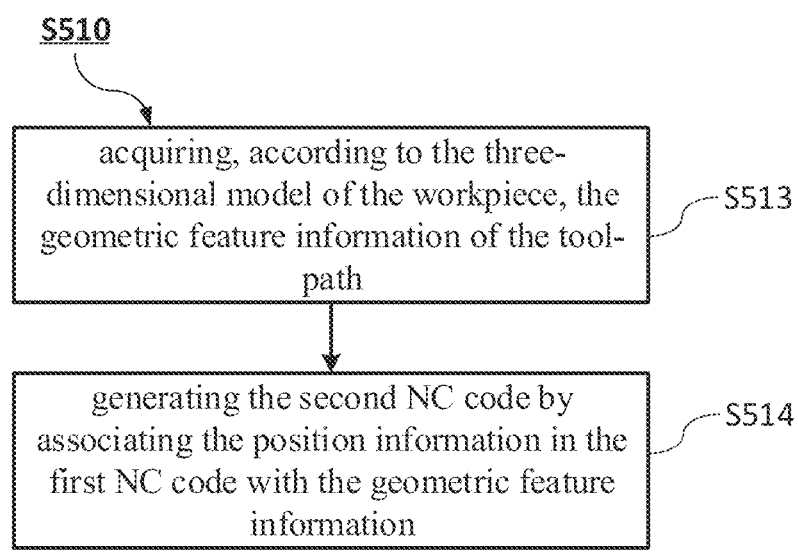
FIG. 7 shows a second example implementation of step S510 according to an embodiment of the invention.

FIG. 7 shows a second example implementation of step S510 according to an embodiment of the invention. This example implementation is applicable to affiliation of points and surface, curvature information, tangent direction information, and tool-path lateral information.

In step S513, the machining controller 120 acquires, according to the three-dimensional model of the workpiece, the geometric feature information of the tool-path;

In step S514, the machining controller 120 generates the second NC code by associating the position information in the first NC code with the geometric feature information.

Figure 8:
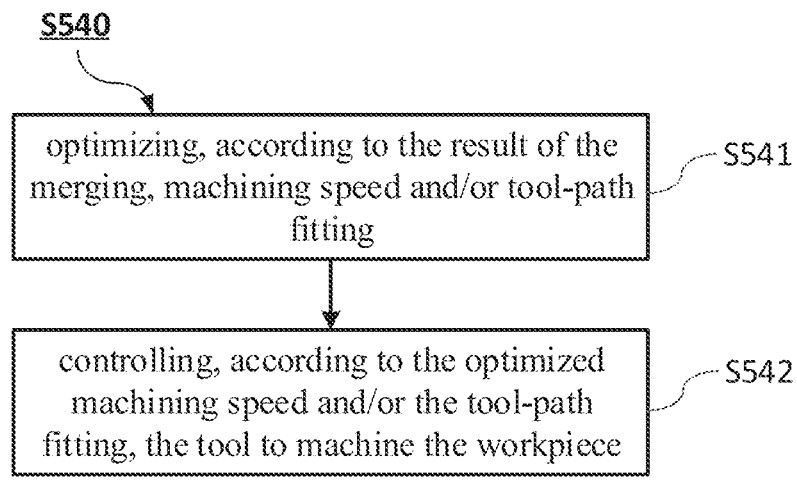
FIG. 8 shows an example implementation of step S540 according to an embodiment of the present invention.

FIG. 8 shows an example implementation of step S540 according to an embodiment of the present invention.

In step S541, the machining controller 120 optimizes, according to the result of the merging, machining speed and/or tool-path fitting;

In step S542, the machining controller 120 controls, according to the optimized machining speed and/or the tool-path fitting, the tool to machine the workpiece.

Figure 9:
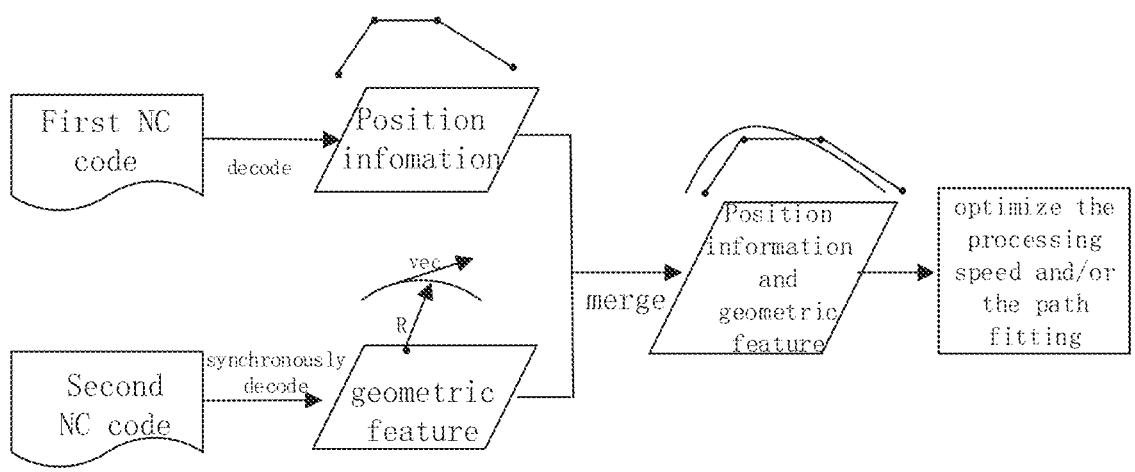
FIG. 9 shows a schematic operation diagram of a machining operation stage according to a first implementation of the method 500.

FIG. 9 shows a schematic operation diagram of a machining operation stage according to a first implementation of the method 500.

As shown in FIG. 9, after the first NC code and the second NC code are simultaneously executed, the machining controller 120 respectively parses out the position information (the first machining information) of the tool on the surface of the workpiece from the first NC code and the second NC code and the geometric feature information (abbreviated as geometric attributes, second machining information) of the tool-path corresponding to the position information. Then, the machining controller 120 merges the first machining information and the second machining information, and optimizes, according to the result of the merging, machining speed and/or tool-path fitting. Finally, the machining controller 120 controls, according to the optimized machining speed and/or the tool-path fitting, the tool to machine the workpiece.

Figure 10:
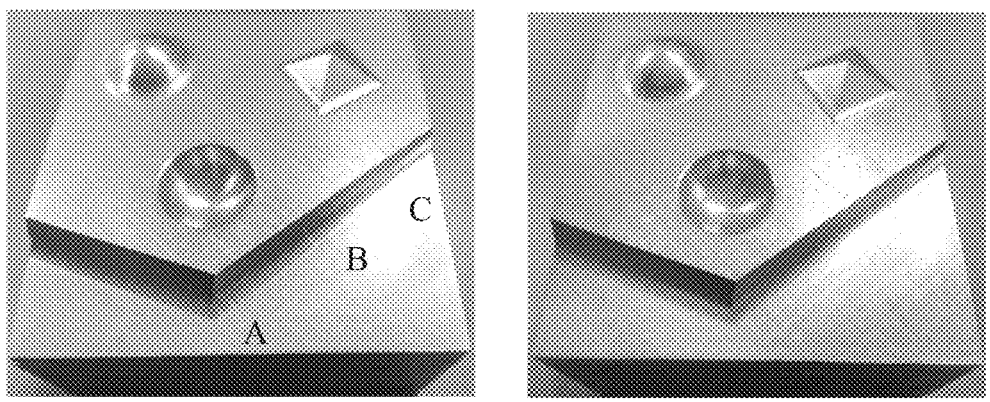
FIG. 10 shows a comparison of machining effects using a second NC code and not using a second NC code.

For example, assuming that the second machining information is geometric feature information, the machining controller 120 may combine the position information in the first NC code and the corresponding tangential vector and curvature in the second NC code into one data structure node with index information (e.g., block number N01, N02, . . . ), for subsequent speed planning and interpolation calculations. Through the joint action of the two codes, the machining quality of the workpiece surface can be significantly improved, especially in the area where the curvature changes greatly, such as the fillet transition area in FIG. 10, While the joint action of two codes is not used, the tool lines and cut marks of the neighbor paths (A, B, and C in FIG. 10) will be inconsistent. as the fillet transition area in FIG. 10, While the joint action of two codes is used, the tool lines and cut marks of the neighbor paths will be consistent, and the surface is more smooth.

Since the first machining information and the second machining information are merged to obtain a data structure with geometric feature information of the tool-path, this data structure can optimize machining speed (including accelerated speed control) and/or path fitting, thereby solving the problem that it is difficult to accurately calculate the geometric attribute information that needs macro analysis and calculation in the process of complex surface processing under strong real-time environment. And the processing accuracy is improved. In addition, the NC control method 500 achieves better processing control with less computational consumption (decoding and merging of codes), while retaining the traditional G code processing method to be compatible with existing programming software and NC system. At the same time, since the machining controller 120 can directly read the geometrical characteristic information of the tool-path from the second NC code, the real-time calculation of complex information in the NC machining process is avoided.

In the second implementation of the method 500, the first machining information comprises position information of the tool on the surface of the workpiece, and the second machining information comprises compensation information of the machining error associated with the characteristic of the machine tool. For example, the compensation information may comprises compensation information of the tracking error.

Figure 11:
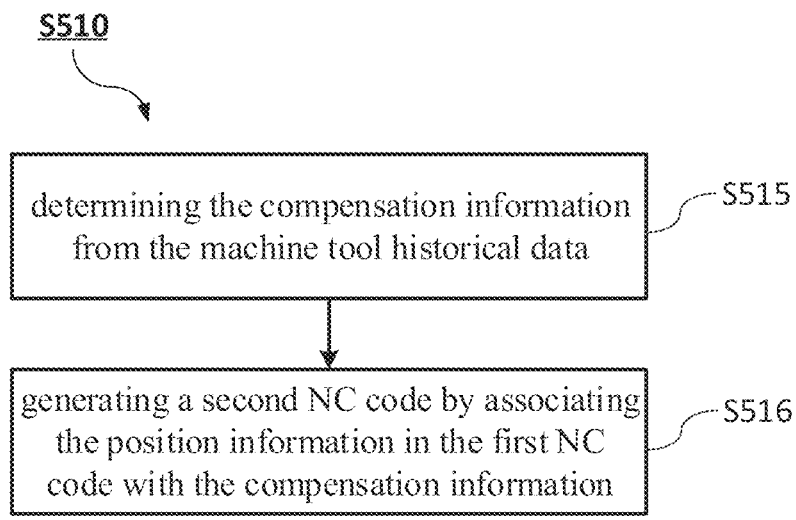
FIG. 11 shows a third example implementation of step S510 according to an embodiment of the invention.

FIG. 11 shows a third example implementation of step S510 according to an embodiment of the invention.

In step S515, the machining controller 120 determines the compensation information from the machine tool historical data;

In step S516, the machining controller 120 generates a second NC code by associating the position information in the first NC code with the compensation information.

Figure 12:
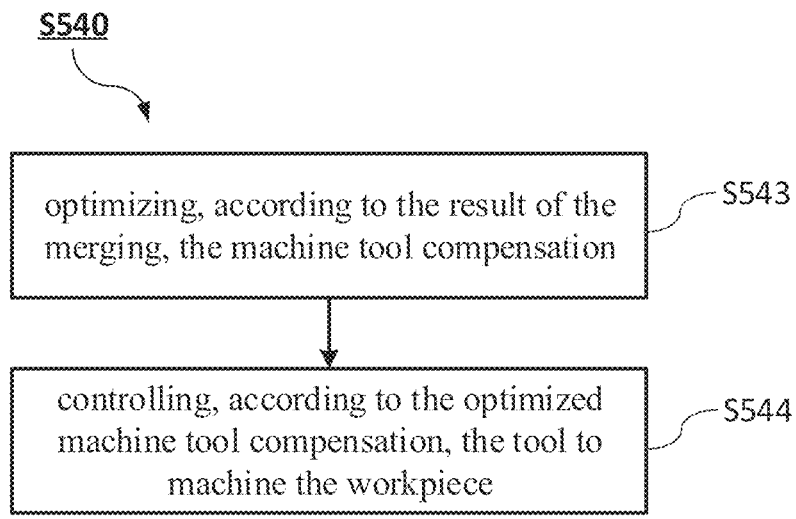
FIG. 12 shows an example implementation of step S540 according to an embodiment of the present invention.

FIG. 12 shows an example implementation of step S540 according to an embodiment of the present invention.

In step S543, the machining controller 120 optimizes, according to the result of the merging, the machine tool compensation.

In step S544, the machining controller 120 controls, according to the optimized machine tool compensation, the tool to machine the workpiece.

Figure 13:
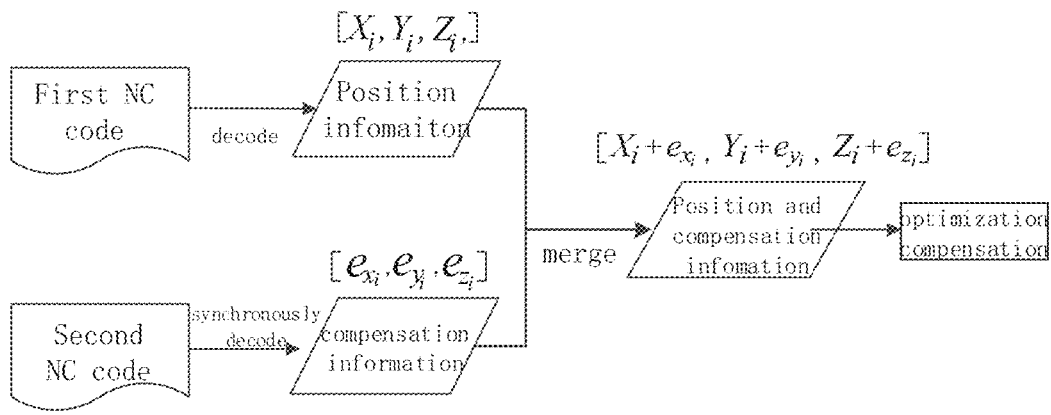
FIG. 13 shows a schematic operation diagram of a machining operation stage according to a second implementation of the method 500.

FIG. 13 shows a schematic operation diagram of a machining operation stage according to a second implementation of the method 500.

As shown in FIG. 13, after the first NC code and the second NC code are simultaneously executed, the machining controller 120 respectively parses out the position information (the first machining information) of the tool on the surface of the workpiece from the first NC code and the second NC code and the compensation information of the machining error associated with the characteristic of the machine tool (the second machining information). Then, the machining controller 120 merges the first machining information and the second machining information, and optimizes, according to the result of the merging, the machine tool compensation. Finally, the machining controller 120 controls, according to the optimized machine tool compensation, the tool to machine the workpiece.

Figure 14:
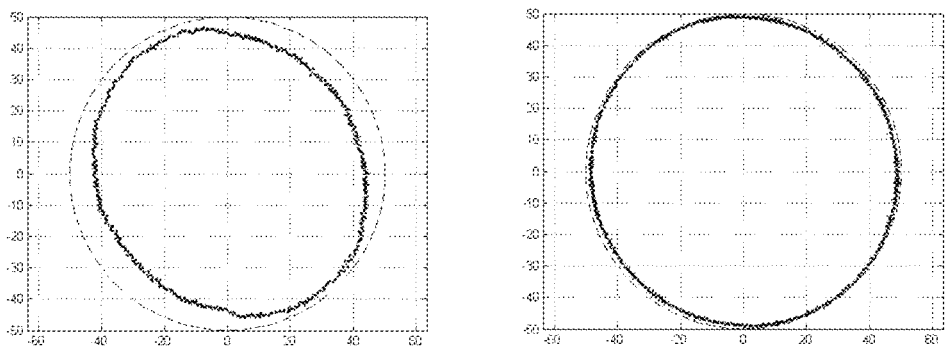
FIG. 14 shows a comparison of processing effects before and after adding the compensation information.

For example, it is assumed that the second machining information is the compensation information of the machining error (here, the tracking error is described as an example) related to the machine tool characteristics, and the original position information in the first NC code is $[X_i, Y_i, Z_i]$. The machining controller 120 may associate and merge the compensation information $[e_{x_i}, e_{z_i}, e_{z_i}]$ of the tracking error corresponding to the position information of each row in the first NC code by the index information. The following optimization results $[X_i+e_{x_i}, Y_i+e_{z_i}, Z_i+e_{z_i}]$ are sequentially stored in the NC system for subsequent interpolation calculation and motion control. FIG. 14 is a processing effect diagram after the error is amplified 1000 times before and after adding the compensation information when the planar grating is used for the roundness test, wherein the dashed line is the command trajectory (for example, the tool-path represented by the G code), and the solid line is the actual trajectory. As shown in the left diagram of FIG. 14, without adding compensation information, the actual trajectory is smaller than the command trajectory and is elliptical. Adding a compensation value to the short axis direction and the overall contour of the above ellipse results in the actual trajectory as shown in the right diagram of FIG. 14. It can be seen that the actual trajectory after adding compensation is closer to the command trajectory.

Since the first machining information and the second machining information are combined to obtain a data structure with compensation information (for example, thermal compensation information and tool wear compensation information, etc.) with machining errors associated with the machine tool characteristics, this data structure can be used to optimize the machine tool compensation to improve the accuracy of the process, optimize the system's dynamic characteristics to enhance the system's ability to resist the load disturbance, and improve the cutting stability of the machine tool.

In a third implementation of the method 500, the first machining information comprises machining process parameter information of the workpiece machining, and the second machining information comprises optimization information of machining process parameter for optimizing machining process parameters. The machining process parameter information may comprise feed speed and/or the spindle speed. Correspondingly, the optimization information of machining process parameter may comprise optimization information of the machining feed speed and/or optimization information of the spindle speed.

Figure 15:
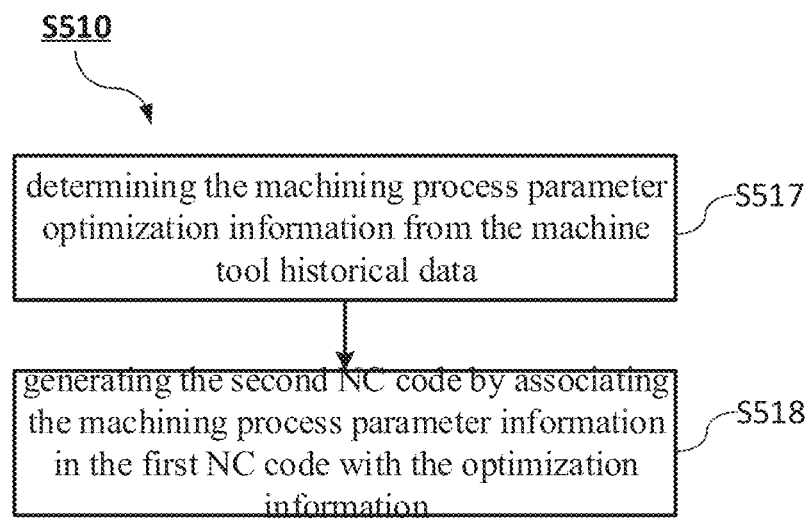
FIG. 15 shows a fourth example implementation of step S510 according to an embodiment of the invention.

FIG. 15 shows a fourth example implementation of step S510 according to an embodiment of the invention.

In step S517, the machining controller 120 determines the machining process parameter optimization information from the machine tool historical data.

In step S518, the machining controller 120 generates the second NC code by associating the machining process parameter information in the first NC code with the optimization information.

Figure 16:
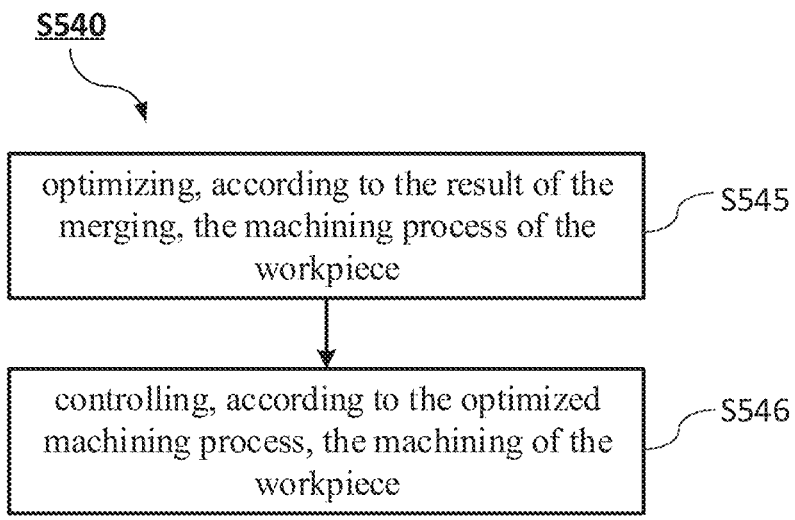
FIG. 16 shows an example implementation of step S540 according to an embodiment of the present invention.

FIG. 16 shows an example implementation of step S540 according to an embodiment of the present invention.

In step S545, the machining controller 120 optimizes, according to the result of the merging, the machining process of the workpiece;

In step S546, the machining controller 120 controls, according to the optimized machining process, the machining of the workpiece.

Figure 17:
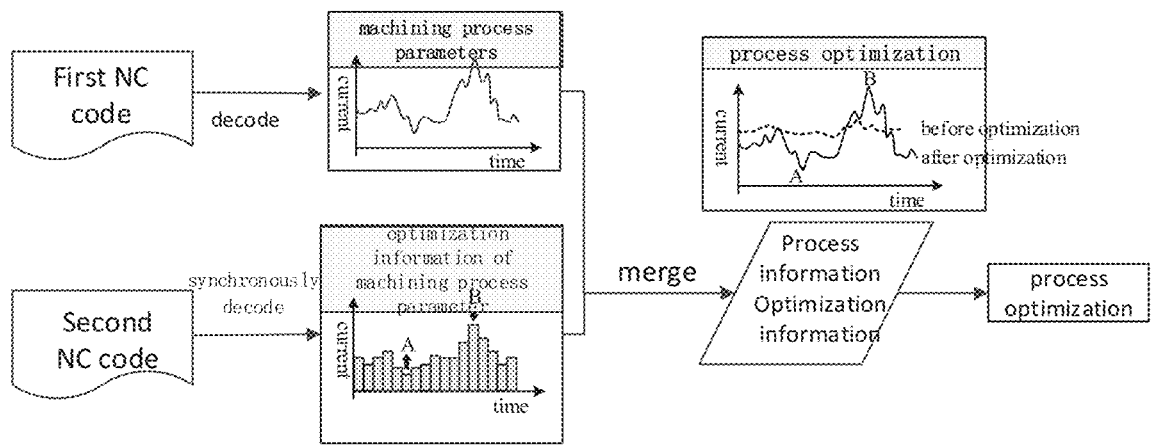
FIG. 17 shows a schematic operation diagram of a machining operation stage according to a third implementation of the method 500.

FIG. 17 shows a schematic operation diagram of a machining operation stage according to a third implementation of the method 500.

As shown in FIG. 17, after the first NC code and the second NC code are simultaneously executed, the machining controller 120 respectively parses the machining process parameter information of the workpiece machining (the first machining information) from the first NC code and the second NC code, and the processing parameter optimization information (the second machining information) used to optimize the processing parameters. Then, the machining controller 120 merges the first machining information and the second machining information, and optimizes, according to the result of the merging, the machining process of the workpiece processing. Finally, the machining controller 120 controls, according to the optimized machining process, the machining of the workpiece.

Figure 18:
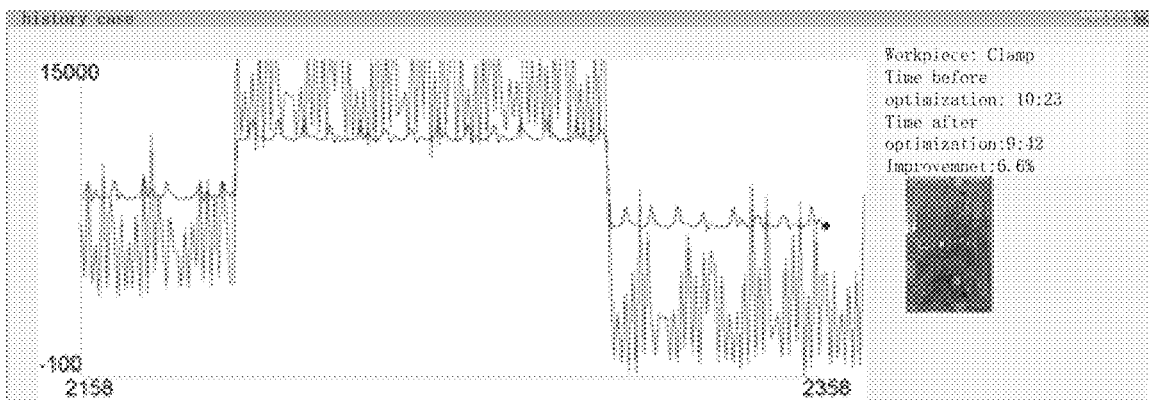
FIG. 18 shows the change of the spindle current before and after the feed speed optimization.

For example, it is assumed that the second machining information is optimization information of machining process parameter (e.g., optimization information of machining feed speed), and the original feed speed in the first NC code is $F_i^\circ$ The machining controller 120 may combine the feed speed and the corresponding feed speed optimization coefficient $K_{F_i}$ in the first NC code by the index information, and store the optimized feed speed $K_{F_i} \times F_i$ in sequence to the NC system for subsequent speed planning. FIG. 18 shows the change of the spindle current before and after the feed speed optimization, wherein, the fluctuation of the spindle current can reflect the optimization effect of the feed speed. Due to the non-uniform surface area of the parts, especially during rough machining, if a constant feed speed is used, the area with a larger margin will have a larger spindle current, and the area with a smaller margin will have a smaller spindle current, which is unfavorable not only to the quality of the machining surface but also to the improvement of processing efficiency. The feed speed is optimized with the second machining information, for example, the feed speed is reduced in the area where the remaining capacity is larger (the spindle current is larger), and the feed speed is increased in the area where the remaining capacity is smaller (the spindle current is smaller). This can balance the spindle current as a whole, thereby improving the processing quality and processing efficiency.

Since the first machining information and the second machining information are combined, a data structure with optimization information of the machining process parameters for optimizing the machining process parameters can be obtained. Such a data structure can be used to optimize the machining process of the workpiece processing, thereby improving the accuracy of machining and the cutting stability of the machine tool. For example, the present invention can improve processing efficiency while reducing the maximum value of the original spindle current, increasing the minimum value, reducing the fluctuation value, and balancing the cutting load of the tool, by providing spindle current optimization information during the NC machining process with the second NC code.

In addition to the second machining information such as the geometric feature information, the compensation information, and the optimization information of machining process parameter described above, the second NC code may further comprise: verification information that verifies whether the first NC code match the second NC code;

In step S550, the machining controller 120 detects whether the first NC code matches the second NC code according to the verification information. For example, the detection may include the following two aspects: whether the naming of the second NC code and the first NC code is consistent; and whether the check information in the second NC code and the last modified time of the first NC code is consistent. If there is a match, method 500 proceeds to step S520, otherwise, subsequent operations cannot be performed and it needs to be reprocessed.

Alternatively, the second NC code may further comprises: index information (also referred to as corresponding relationship information) for establishing a block mapping relationship between the first NC code and the second NC code, such as the block number of the blocks. In other words, the machining controller 120 may establish a block mapping relationship between the second NC code and the first NC code according to the block number of the second NC code, so as to synchronously resolve the position information in the first NC code and the geometrical feature information (e.g., radius of curvature, tangent direction), compensation information, and optimization information of machining process parameter of the tool-path matched in the second NC code.

With the NC control method 500, the present invention can optimize the NC process without changing the format and syntax of existing G code, by adding a second NC code that comprises information such as geometric attribute information of the tool-path, compensation and optimization information, which contributes to improvement of the machining effect. In addition, the NC control method achieves better processing control with less computational consumption (decoding and merging of codes), while retaining the traditional G code processing method to be compatible with existing programming software and NC system.

Figure 19:
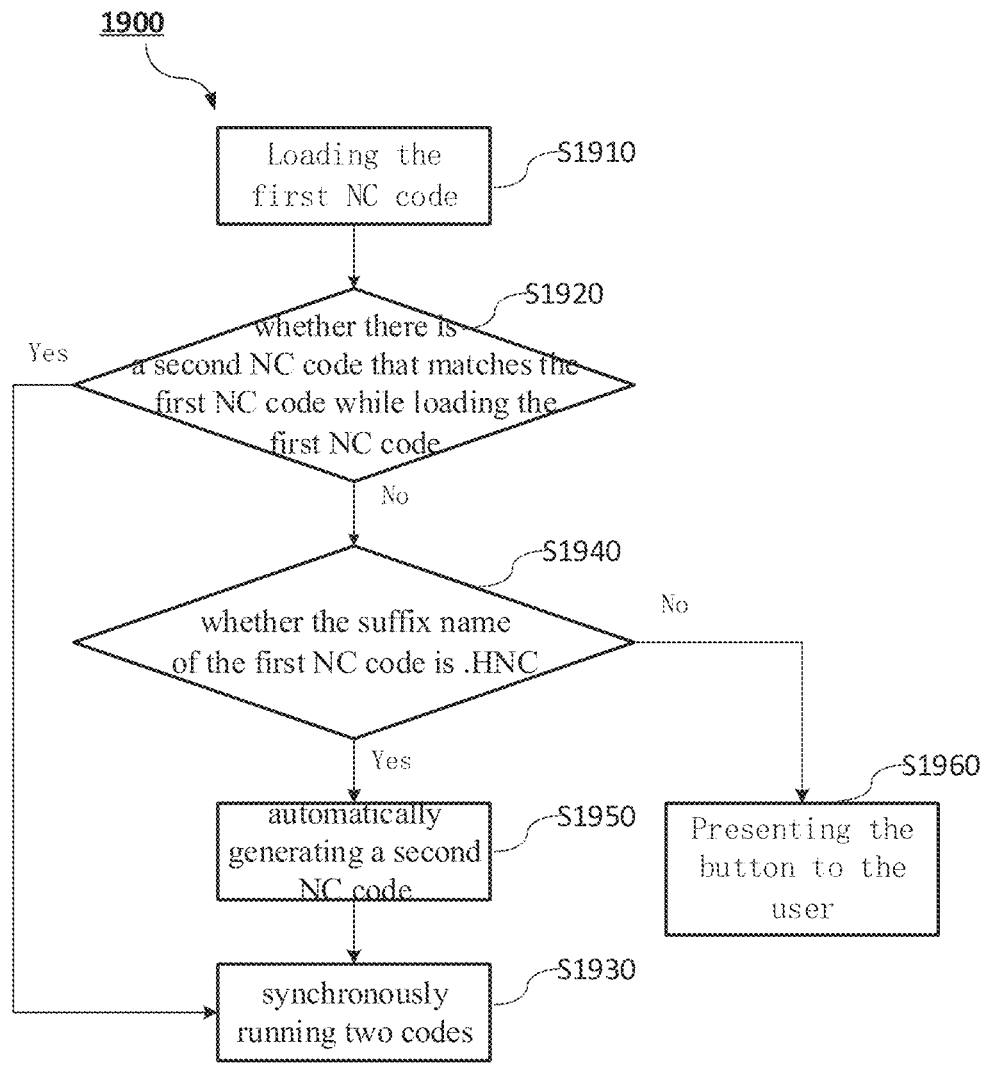
FIG. 19 is a schematic flow chart illustrating an example of a NC control method 500 according to an embodiment of the present invention.

FIG. 19 is a schematic flow chart illustrating an example of a NC control method 500 according to an embodiment of the present invention. In this example, the second NC code is generated by the NC system (machining controller 120). The second NC code generated by the NC system has a file suffix name of .INC, and the second NC code has the same name as the first NC code. The second NC code of the NC system and the specific steps of synchronous running of two sets of NC codes will be described in detail below.

In step S1910, the NC system loads the first NC code, and turns on the sub code use switch, that is, sets the second NC code enable parameter to 1 (indicating that the second NC code is used, and setting 0 means not using the second NC code).

In step S1920, the NC system detects whether there is a second NC code that matches the first NC code while loading the first NC code. For example, it can be detected whether the naming of the second NC code and the first NC code is consistent and whether the check information in the second NC code and the last modified time of the first NC code is consistent.

In step S1930, if it is detected that the second NC code matches with the first NC code, the first NC code and the second NC code may be synchronously run.

In step S1940, if it is not detected that the second NC code matches the first NC code, the NC system detects whether the suffix name of the first NC code is .HNC.

If it is .HNC, the NC system automatically generates a second NC code (step S1950), otherwise a button "subcode" is presented (step S1960) to the user for manually generating a second NC code by clicking the button.

In addition, the NC saves the generated second NC code to avoid the next regeneration.

In this example, the NC system uses the first and second NC codes for synchronous machining, but only the contents of the first NC code are displayed on the interface of machining operations. In this way, when a problem occurs in the machining program, it is convenient for the machine operator to set breakpoint for debugging analysis (some NC systems use NURBS curve interpolation processing, so the NC system interface displays the control point of the NURBS curve, so it is unable to set breakpoints exactly where debugging is needed).

Figure 20:
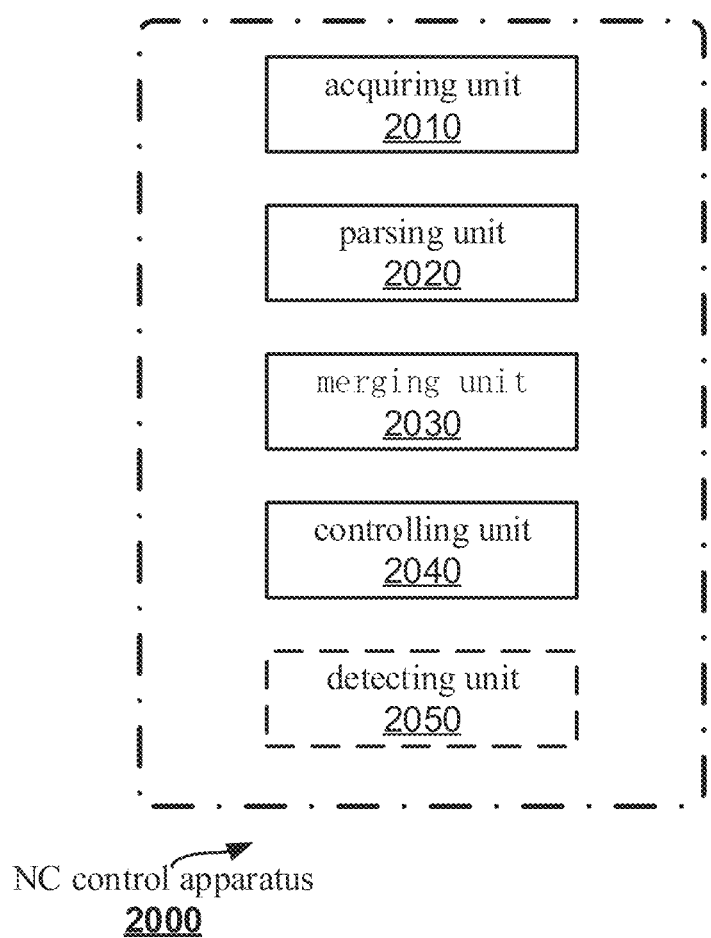
FIG. 20 is a block diagram showing a structure of a NC control apparatus 2000 according to an embodiment of the present invention.

FIG. 20 is a block diagram showing a structure of a NC control apparatus 2000 according to an embodiment of the present invention. The NC control apparatus 2000 is based on the joint action of two codes as described above in connection with FIG. For example, the NC control apparatus 2000 may be implemented on the machining controller 120 or the NC system (CNC) of FIG. 1, and may also perform the NC control method 500. As shown in FIG. 20, the NC control apparatus 2000 includes an acquiring unit 2010, a parsing unit 2020, a merging unit 2030, a controlling unit 2040, and a detecting unit 2050, wherein the detecting unit 2050 is optional.

In one implementation, the first machining information comprises position information of the tool on the surface of the workpiece, and the second machining information comprises the geometric feature information of the tool-path corresponding to the position information.

In one implementation, the controlling unit 2040 is configured to: optimize machining speed and/or path fitting according to the merged results; and control, according to the optimized machining speed and/or the tool-path fitting, the tool to machine the workpiece.

In one implementation, the obtaining unit 2010 is configured to: determine, according to the first NC code, the geometric feature information of the tool-path; and generating the second NC code by associating the position information in the first NC code with the geometric feature information.

In one implementation, the geometric feature information includes at least one of the following: curvature information; tangent direction information; and tool-path lateral information, comprising the corresponding relationship between the geometric feature information of neighbor cutter location of two neighbor paths in the direction perpendicular to the path.

In one implementation, the acquiring unit 2010 is configured to: acquire geometric feature information of a tool-path according to a three-dimensional model of the part; and generating the second NC code by associating the position information in the first NC code with the geometric feature information.

In one implementation, the geometric feature information includes at least one of the following: affiliation of points and surface, including the correspondence between the cutter location points and the surfaces that make up the face of the workpiece; curvature; tangent direction; and tool-path lateral information, comprising the corresponding relationship between the geometric feature information of neighbor cutter location of two neighbor paths in the direction perpendicular to the path.

In one implementation, the first machining information comprises position information of the tool on the surface of the workpiece, and the second machining information comprises compensation information of the machining error associated with the characteristic of the machine tool.

In one implementation, the controlling unit 2040 is configured to: optimizing, according to the result of the merging, machine tool compensation; and controlling, according to the optimized machine tool compensation, the tool to machine the workpiece.

In one implementation, the acquiring unit 2010 is configured to: determining the compensation information from the machine tool historical data; and generating the second NC code by associating the position information in the first NC code with the compensation information.

In one implementation, the compensation information comprises compensation information of the tracking error.

In one implementation, the first machining information comprises machining process parameter information of the workpiece machining, and the second machining information comprises optimization information of machining process parameter for optimizing machining process parameters.

In one implementation, the controlling unit 2040 is configured to: optimize the machining process of the workpiece processing according to the merged results; and controlling, according to the optimized machining process, the machining of the workpiece.

In one implementation, the acquiring unit 2010 is configured to: determine the optimization information of machining process parameter from the machine tool historical data; and generate the second NC code by correlating the machining process parameter information in the first NC code with the optimization information.

In one implementation, the optimization information of machining process parameter comprises optimization information of the machining feed speed and/or optimization information of the spindle speed.

In one implementation, the second NC code comprises: verification information that verifies whether the first NC code match the second NC code; and index information for establishing the NC blocks mapping relationship between the first NC code and the second NC code.

In one implementation, the index information is the block number of the NC blocks.

In one implementation, the detecting unit 2050 is configured to: verify, according to the verification information, whether the first NC code and the second NC code is match, before simultaneously running the first NC code and the second NC code.

Figure 21:
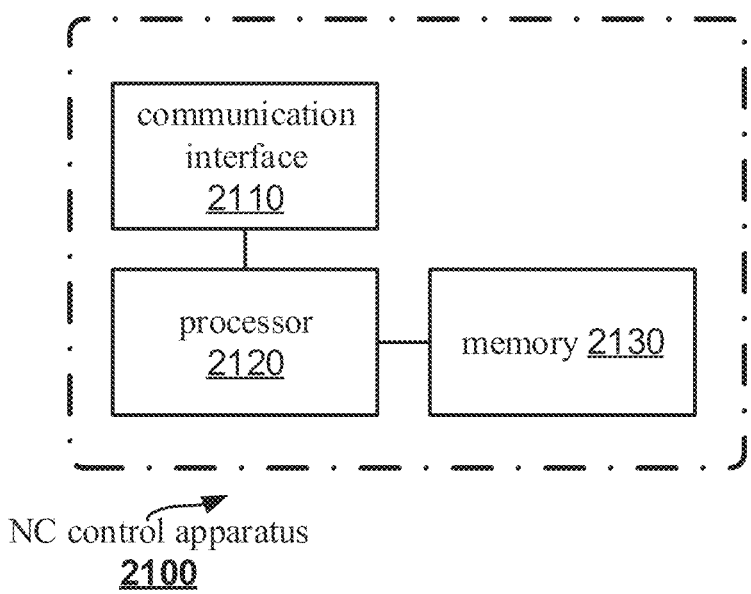
FIG. 21 is a block diagram showing a structure of a NC control apparatus 2100 according to an embodiment of the present invention.

FIG. 21 is a block diagram showing a structure of a NC control apparatus 2100 according to an embodiment of the present invention. The NC control apparatus 2100 is based on the joint action of two codes as described above in connection with FIG. For example, the NC control apparatus 2100 may be any device having a three-dimensional model analysis and processing capability such as a hand-held computer, a laptop computer, a tablet computer, and so on. The NC control apparatus 2100 may be implemented on the machining controller 120 or the NC system (CNC) of FIG. 1, and may also perform the NC control method 500.

As shown in FIG. 21, the NC control apparatus 2100 includes a communication interface 2110, a processor 2120 (for example, a CPU), and a memory 2130. For ease of illustration, one processor is schematically shown in FIG. 21. However, those skilled in the art should understand that the NC control apparatus 2100 may also include two or more processors.

The communication interface 2110 is used to communicate with the outside. For example, the communication interface 2110 may be an Ethernet (Ethernet, registered trademark) interface. The NC control apparatus 2100 can communicate with the code generator 110 through the communication interface 2110 using a certain communication protocol. The communication interface 2110 can also provide direct communication between the user and the NC control apparatus 2100. For example, the communication interface 2110 may also be an input device (e.g., a keyboard, a mouse, etc.) and an output device (e.g., a displayer) that presents the user with a three-dimensional model of the workpiece and receives the user's input regarding the workpiece's processing requirements.

The memory 2130 stores instructions executable by the processor 2120, so that the NC control apparatus 2100 executes the NC control method 500 described with reference to FIGS. 5-19.

The present invention also provides at least one computer storage medium in the form of a non-volatile or volatile memory, such as an Electrically Erasable Programmable Read-Only Memory (EEPROM), a flash memory, and a hard disk drive, stored with computer-executable instructions. The computer-executable instructions, when executed by the processor, cause the NC control apparatus to perform actions such as those previously described with reference to FIGS. 5-19.

The processor may be a single CPU (Central Processing Unit) but may also include two or more processors. For example, a processor may include a general-purpose microprocessor; an instruction set processor and/or related chipsets and/or a special purpose microprocessor (e.g., an Application Specific Integrated Circuit (ASIC)). The processor may also include on-board memory for caching purposes. For example, a computer storage medium may be flash memory, Random Access Memory (RAM), Read Only Memory (ROM), or EEPROM.

What claimed is:

1. A NC control method, comprising:
   acquiring a first NC code and a second NC code, wherein the first NC code comprises first machining information for controlling a tool to machine a workpiece, and the second NC code comprises second machining information for enhancing the first machining information;
   simultaneously running the first NC code and the second NC code to parse out the first machining information and the second machining information;
   merging the first machining information and the second machining information; and
   controlling, according to the result of the merging, the tool to machine the workpiece,
   wherein, the first machining information comprises position information of the tool on the surface of the workpiece, and the second machining information comprises geometric feature information of a tool-path corresponding to the position information,
   wherein, the acquiring the second NC code, comprises:
   determining, according to the first NC code, the geometric feature information of the tool-path; and
   generating the second NC code by associating the position information in the first NC code with the geometric feature information of the tool-path, and
   wherein, the geometric feature information of the tool-path comprises at least one of the following:
   curvature information;
   tangent direction information; and
   tool-path lateral information, comprising the corresponding relationship between the geometric feature information of the tool-path of neighbor cutter location of two neighbor paths in the direction perpendicular to the path.

2. The method according to claim 1, wherein, the controlling, according to the result of the merging, the tool to machine the workpiece, comprises:
   optimizing, according to the result of the merging, machining speed and/or tool-path fitting; and
   controlling, according to the optimized machining speed and/or the tool-path fitting, the tool to machine the workpiece.

3. The method according to claim 1, wherein, the acquiring the second NC code, comprises:
   acquiring, according to three-dimensional model of the workpiece, the geometric feature information of the tool-path; and
   generating the second NC code by matching the position information in the first NC code with the geometric feature information of the tool-path.

4. The method according to claim 3, wherein, the geometric feature information of the tool-path comprises at least one of the following:
   topology of points and surface in the model, including the correspondence between the cutter location points and the original surfaces of the workpiece;
   curvature information;
   tangent direction information; and
   tool-path lateral information, comprising the corresponding relationship between the geometric feature information of the tool-path of neighbor cutter location of two neighbor paths in the direction perpendicular to the path.

5. The method according to claim 1, wherein, the first machining information comprises position information of the tool on the surface of the workpiece, and the second machining information comprises compensation information of machining error associated with characteristic of the machine tool.

6. The method according to claim 5, wherein, the controlling, according to the result of the merging, the tool to machine the workpiece, comprises:
   optimizing, according to the result of the merging, machine tool compensation; and
   controlling, according to the optimized machine tool compensation, the tool to machine the workpiece.

7. The method according to claim 5, wherein, the acquiring the second NC code, comprises:

determining the compensation information from the machine tool historical data; and generating the second NC code by associating the position information in the first NC code with the compensation information.

8. The method according to claim 5, wherein, the compensation information comprises compensation information of tracking error.

9. The method according to claim 1, wherein, the first machining information comprises machining process parameters of the workpiece, and the second machining information comprises optimization information of machining process parameter for optimizing machining process parameters.

10. The method according to claim 9, wherein, the controlling, according to the result of the merging, the tool to machine the workpiece, comprises:

optimizing, according to the result of the merging, the machining process of the workpiece; and controlling, according to the optimized machining process, the machining of the workpiece.

11. The method according to claim 9, wherein, the acquiring the second NC code, comprises:

determining the optimization information of machining process parameters from the machine tool historical data; and generating the second NC code by correlating the machining process parameter information in the first NC code with the optimization information.

12. The method according to claim 9, wherein, the optimization of machining process parameter comprises optimization of machining feed speed and/or optimization of spindle speed.

13. The method according to claim 1, wherein, the second NC code comprises:

verification information for checking whether the first NC code and the second NC code match or not; and index information for establishing the NC blocks mapping relationship between the first NC code and the second NC code.

14. The method according to claim 13, wherein, the index information is the block number of the NC blocks.

15. The method according to claim 13, wherein, before simultaneously running the first NC code and the second NC code, further comprising:

verifying, according to the verification information, whether the first NC code and the second NC code is match.

16. ANC control apparatus, comprising:

communication Interface;

at least one processor; and a memory that stores the processor-executable instructions that, when executed by the at least one processor, enable the apparatus to perform the method of claim 1.

17. A non-transitory computer storage medium storing computer-executable instructions that, when executed by at least one processor of a NC control apparatus, enable the apparatus to perform the method of claim 1.

* * * * *